United States Patent [19]

Yano et al.

[11] Patent Number: 5,519,542
[45] Date of Patent: May 21, 1996

[54] COATING COMPOSITION FOR PREPARING BACK COATING FILM OF MIRROR

[75] Inventors: Mitsuyoshi Yano; Keiji Mitsuda; Minoru Murakami, all of Amagasaki; Motoyuki Sakatoku, Mie; Kenichi Hayashi, Matsusaka; Hidenori Aonuma, Matsusaka; Tutomu Mizutani, Matsusaka, all of Japan

[73] Assignee: Central Glass Company, Limited, Ube, Japan

[21] Appl. No.: 259,979

[22] Filed: Jun. 17, 1994

[30] Foreign Application Priority Data

Jun. 21, 1993 [JP] Japan .................................. 5-148929

[51] Int. Cl.$^6$ ................................. G02B 5/08; C09J 7/04
[52] U.S. Cl. ........................ 359/884; 359/883; 428/357; 428/417; 428/418
[58] Field of Search ..................................... 359/883, 884, 359/848, 845, 885; 428/35.7, 35.8, 418, 35.9, 417; 156/330, 331.1

[56] References Cited

U.S. PATENT DOCUMENTS

| 4,482,209 | 11/1989 | Grewal et al. | 359/883 |
| 5,216,551 | 6/1993 | Fujii | 359/884 |

FOREIGN PATENT DOCUMENTS

| 0072104 | 5/1982 | Japan | 359/884 |
| 63-184702 | 7/1988 | Japan . | |
| 63-184701 | 7/1988 | Japan . | |
| 0184701 | 7/1988 | Japan | 359/884 |
| 3-75007 | 3/1991 | Japan . | |
| 3-75006 | 3/1991 | Japan . | |
| 2227432 | 1/1990 | United Kingdom | 359/884 |

*Primary Examiner*—Paul M. Dzierzynski
*Assistant Examiner*—Mohammad Y. Sikder
*Attorney, Agent, or Firm*—Keck, Mahin & Cate

[57] ABSTRACT

The invention relates to a coating composition for preparing a back coating film of a mirror. The mirror has a glass substrate, a silver mirror film formed on a back surface of the glass substrate, a metallic protective film formed on the silver mirror film, and the back coating film formed on the metallic protective film. The coating composition comprises: a binder consisting of 40 to 85 parts by weight of the total of an epoxy resin and a hardener of the epoxy resin, and 15 to 60 parts by weight of at least one selected from the group consisting of a ketone formaldehyde resin and its derivatives; and a pigment blend containing 7–55 wt % of a corrosion-inhibitive pigment based on the weight of the pigment blend. The weight ratio of the pigment blend to the binder is in the range from 1.2 to 4.0. The back coating film is superior in chemical resistance and corrosion resistance even if a lead-free corrosion-inhibitive pigment is used.

11 Claims, No Drawings

5,519,542

COATING COMPOSITION FOR PREPARING BACK COATING FILM OF MIRROR

BACKGROUND OF THE INVENTION

The present invention relates to a coating composition for preparing a back coating film of a mirror.

To protect a mirror having a silver mirror film, the silver mirror film is coated with a metallic protective film and then the metallic protective film is coated with the back coating film. In fact, the back coating film is provided, for example, for preventing breakage of the mirror and increasing mechanical strength and corrosion resistance of the mirror against water, water vapor, various gases, acids, alkalis, detergents and the like. A conventional coating composition for preparing the back coating film contains, as a binder, lacquer, alkyd resin, melamine alkyd resin, phenol alkyd resin or the like, and, as a corrosion-inhibitive pigment, red lead, lead cyanamide, basic lead carbonate, basic lead sulfate, calcium plumbate or the like. However, this conventional composition is not able to provide a back coating film which is proof against a severe environment.

In view of this, for example, JP-A-63-184701 and JP-A-63-184702 disclose coating compositions for preparing a back coating film of a mirror so as to improve corrosion resistance, durability and workability of the mirror. The coating composition of the former publication contains a binder including an epoxy resin, a hardener, a rosin and/or a petroleum resin. The coating composition of the latter publication contains a binder including an epoxy resin, a hardener and a coumarone indene resin. The rosin contains abietic acid, L-pimaric acid and the like, and thus is considerably high in acid and iodine values. The petroleum resin is a copolymer of hydrocarbon compounds having unsaturated bonds of a petroleum fraction. The petroleum resin takes various forms such as aromatic type, aliphatic type, aliphatic-aromatic and alicylic type, and has active double bonds as is apparent by bromine and iodine values and the like. The coumarone indene resin is a copolymer of coumarone, indene, styrene and the like of naphtha fraction and has active double bonds. Thus, the coating compositions of the above publications contain resins having active double bonds. With this, the back coating film tends to be undesirably oxidized with the passage of time. Furthermore, it is known that a conventional two-package coating composition containing a hardener such as the compositions of the above publications is superior in adhesion and chemical resistance, but is unsatisfactory in workability to cut the mirror. That is, the back coating film tends to peel off when the mirror is cut.

JP-A-3-75006 and JP-A-3-75007 disclose coating compositions for preparing a back coating film of a mirror, which contain an amino modified epoxy resin prepared by reacting an epoxy resin with amino-alcohols, so as to improve corrosion resistance, durability and workability of the mirror. However, the back coating films prepared from these coating compositions are not substantially improved in chemical resistance and the like due to the lack of hardener in the coating composition.

SUMMARY OF THE INVENTION

It is therefore an object of the present invention to provide a coating composition for preparing a back coating film of a mirror, which is improved in corrosion resistance, chemical resistance, workability to cut the mirror and the like and enables the use of a lead-free corrosion-inhibitive pigment in the coating composition.

According to a first aspect of the present invention, there is provided a coating composition for preparing a back coating film of a mirror, the mirror having a glass substrate, a silver mirror film formed on a back surface of the glass substrate, a metallic protective film formed on the silver mirror film, and the back coating film formed on the metallic protective film, the coating composition comprising:

a binder consisting of 40 to 85 parts by weight of the total of an epoxy resin and a hardener of the epoxy resin, and 15 to 60 parts by weight of at least one selected from the group consisting of a ketone formaldehyde resin and its derivatives; and a pigment blend containing 7–55 wt % of a corrosion-inhibitive pigment based on the weight of said pigment blend, wherein the weight ratio of said pigment blend to said binder is in the range from 1.2 to 4.0.

According to a second aspect of the present invention, there is provided a mirror comprising:

a glass substrate;

a silver mirror film formed on a back surface of said glass substrate;

a metallic protective film formed on said silver mirror film; and a back coating film formed on said metallic protective film, said back coating film being prepared by curing the above-mentioned coating composition.

According to the present invention, workability to cut the mirror is improved by using the ketone formaldehyde resin which does not have polymerizable double bonds and a softening point ranging from 75° to 130° C. and is compatible with the epoxy resin. Furthermore, shrinking stress of the back coating film, which undesirably affects the silver mirror film and the metallic protective film, is made small by controlling the weight ratio of the pigment blend to the binder in the above range.

DESCRIPTION OF THE PREFERRED EMBODIMENTS

According to the present invention, an improved coating composition for preparing a back coating film of a mirror will be described in the following.

The mirror has a conventional glass substrate, a conventional silver mirror film, and a conventional metallic protective film. The silver mirror film is formed on a back surface of the glass substrate by a chemical plating method using silver mirror reaction, a vacuum plating, or another conventional physical or chemical film-forming method. The thickness of the silver mirror film is controlled in the range from 60 to 70 nm or not greater than 100 nm so as to reflect about the total of incident light. The metallic protective film is formed on the silver mirror film by a chemical plating or another film-forming method. The metallic protective film is made of copper, tin, an alloy of these metals or the like, which is greater than silver in ionization tendency. With this, the metallic protective film is corroded prior to the silver mirror film for protecting the same. The thickness of the metallic protective film is several tens of nanometers or not greater than about 50 nm.

The coating composition according to the present invention contains a binder consisting of an epoxy resin, a hardener, and at least one selected from the group consisting of a ketone formaldehyde resin (ketone resin) and its derivatives. Examples of a ketone of the ketone resin are cyclohexanone, ethyl methyl ketone, isobutyl methyl ketone and acetophenone. Of these, cyclohexanone provides particularly superior coating film characteristics and thus is the most preferable example. The ketone resin prepared from cyclohexanone is represented by the following formula (3). In fact, this ketone resin is a condensation produce between cyclohexanone represented by the following formula (1) and formaldehyde represented by the following formula (2). This ketone resin does not have active double bonds, is compatible with the epoxy resin, and improves adhesion to a copper film as the metallic protective film.

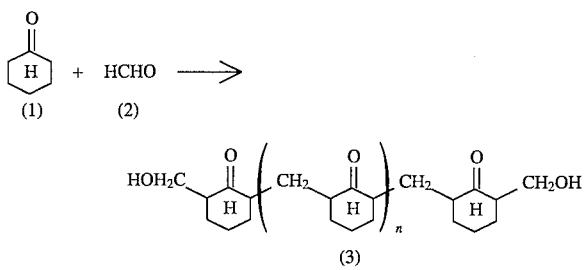

A mixture of the ketone resin and the epoxy resin is stable, and its characteristics are hard to alter with the passage of time. An example of the derivatives of the ketone resin is a partially hydrogenated ketone resin. It is preferable that the ketone resin has a softening point ranging from 75° to 130° C. If it is lower than 75° C., for example, the back coating film tends to be softened after immersion test in hot water. If it is higher than 130° C., the back coating film tends to peel off when the mirror is cut. With this, it is difficult to sharply cut the mirror.

The amount of at least one selected from group consisting of the ketone resin and its derivatives is preferably from 15–60 parts by weight relative to 40–85 parts by weight of the total of the epoxy resin and the hardener. It is more preferably from 25–55 parts by weight relative to 45–75 part-s by weight of the total of the epoxy resin and the hardener. If it is less than 15 parts by weight, workability to cut the mirror becomes unsatisfactory. That is, the back coating film tends to peel off when the mirror is cut. If it is greater than 60 parts by weight, the back coating film becomes inferior in chemical resistance and so on and edge portions of the back coating film becomes insufficient in adhesion. Examples of the ketone resin and its derivatives are KETONEREDIN K90 which is a trade name of ARAKAWA CHEMICAL CO., LTD., HILAC 111which is a trade name of HITACHI CHEMICAL CO., LTD., and Synthetic resin AP and Synthetic resin SK which are trade names of HULLS.

The epoxy resin of the binder is a resin having at least two epoxy groups per one molecule. In the invention, it is preferable to use an epoxy resin having a molecular weight ranging from about 300 to about 4,000 and an epoxy equivalent ranging from about 150 to about 3,500. A preferable example of the epoxy resin is a bisphenol A epichlorohydrine type epoxy resin. Examples of the bisphenol A epichlorohydrine type epoxy resin are EPOMIK R140, EPOMIK R144, EPOMIK R301, EPOMIK R304, EPOMIK R307 and EPOMIK R309 which are trade names of MITSUI PETROCHEMICAL INDUSTRIES. LTD., and EPIKOTE 828, EPIKOTE 836, EPIKOTE 1001, EPIKOTE 1004, EPIKOTE 1007 and EPIKOTE 1009 which are trade names of YUKA SHELL CHEMICAL CO., LTD. Other examples of the epoxy resin are a novolac type epoxy resin, a bisphenol F type epoxy resin, a bisphenol S type epoxy resin, a 2,6-xylenol type epoxy resin, an epoxidated polybutadiene resin, an alicyclic brominated epoxy resin, a heterocyclic epoxy resin, a bisphenol type epoxy resin modified by ethylene glycol, propylene glycol or the like. These examples may be used individually or mixed. Examples of the novolac type epoxy resin are EPIKOTE 152 and EPIKOTE 154 which are trade names of YUKA SHELL CHEMICAL CO., LTD.,.and YDCN-701, YDCN-702 and YDCN-703 which are trade names of TOHTO KASEI CO., LTD.

The hardener of the epoxy resin reacts with epoxy groups of the epoxy resin. Thus, an example of the hardener is an amine type hardener having, per one molecule, at least two nitrogen atoms and active hydrogen atoms bonded to the nitrogen atoms. Examples of the amine type hardener are an amine adduct, a polyamide resin and a polyamine.

Examples of the amine adduct are EUREDUR 30 which is a trade name of WITCO GMBH, and TOHMIDE 238 and FUJICORE 202 which are trade names of FUJI KASEI KOGYO CO., LTD. Examples of the polyamide resin are TOHMIDE 210, TOHMIDE 225, TOHMIDE 245, TOHMIDE 2400 and TOHMIDE 2500 which are trade names of FUJI KASEI KOGYO CO., LTD., EUREDUR 100, EUREDUR 115, EUREDUR 125 and EUREDUR 140 which are trade names of WITCO GMBH, and POLYMIDE H-1060, POLYMIDE H-2270 and POLYMIDE H-2870 which are trade names of SANYO CHEMICAL INDUSTRIES. LTD. Examples of the polyamine are diethylenetriamine, triethylenetetramine, tetraethylenepentamine, dipropylenetriamine, diethylaminopropylamine, menthanediamine, isophoronediamine, m-xylenediamine, diaminodiphenylmethane, m-phenylenediamine, N-2-aminoethylpiperidine, N-2-aminoethylpiperazine and N-2-aminoethylmorpholine.

The pigment blend according to the present invention contains a corrosion-inhibitive pigment and other pigments such as a body pigment and a coloring pigment. Examples of the body pigment are talc, precipitated barium sulfate, mica, kaolin, calcium carbonate and barite. Examples of the coloring pigment are titanium oxide, red iron oxide, yellow iron oxide, yellow lead, iron black, carbon black and Phthalocyanine Blue. Examples of the corrosion-inhibitive pigment are calcium plumbate, basic lead sulfate, basic lead carbonate, red lead, lead cyanamide, zinc oxide, aluminum phosphate, zinc phosphate, calcium zinc phosphate, aluminum tripolyphosphate, zinc molybdate, calcium molybdate, barium metaborate, calcium zinc molybdate, calcium cyanamide, aluminum phosphomolybdate, and a mixture of calcium oxide and iron oxide.

According to the present invention, it is necessary that the weight ratio of the pigment blend to the binder is in the range from 1.2 to 4.0. It is preferable that the weight ratio is in the range from 1.5 to 3.5. If the weight ratio is less than 1.2, blistering occurs in the after-mentioned water resistance test and edge portions of the back coating film become inferior in adhesion. If the weight ratio is greater than 4.0, the back coating film tends to become inferior in acid resistance and adhesion.

It is preferable that the pigment blend according to the present invention contains 7–55 wt % of the corrosion-inhibitive pigment based en the weight of the pigment blend. It is more preferable that the corrosion-inhibitive pigment content is in the range from 10 to 45 wt %. If it is less than 7 wt %, the back coating film becomes inferior in salt water resistance and acid resistance. If it is greater than 55 wt %, the back coating film becomes inferior in adhesion.

A conventional back coating film requires the use of a lead-containing pigment as an essential component to provide the conventional back coating film with corrosion resistance. In contrast, according to the present invention, it is not necessary to use a lead-containing pigment. Unlike a conventional back coating film, the back coating film according to the present invention becomes superior in corrosion resistance by only adding a lead-free corrosion resistance pigment to the binder because the binder of the present invention comprises a mixture of the epoxy resin and the ketone resin, which is superior in corrosion resistance. Therefore, the use of the back coating film according to the present invention may contribute to the reduction of lead pollution problems.

In the invention, a certain amount of a conventional solvent such as a hydrocarbon, an ester, a ketone, an alcohol or the like is added to the binder for dissolving the resins. Furthermore, in the invention, a dispersing agent, an antisetting agent, a defoamer and the like may be added to the binder for improving workability of the application of the coating composition and the external appearance of the back coating film.

The coating composition of the present invention is a two package coating composition. Therefore, a main mixture and the hardener are separately prepared. The main mixture is prepared by mixing the epoxy resin, the ketone resin, the pigment blend and the like. The main mixture is uniformly mixed with a sand mill, a ball mill, an attritor, a roller mill or the like. Then, the main mixture and the hardener are mixed immediately before the application of the coating composition.

The back coating film is formed by a chemical reaction between epoxy groups of the epoxy resin and active hydrogen atoms bonded to nitrogen atoms of the hardener. The equivalent ratio of the epoxy resin to the hardener is preferably from 1:2 to 2:1. If it is less than 1:2, the back coating film becomes insufficient in hardening and inferior in chemical resistance. If it is greater than 2:1, the back coating film becomes inferior in chemical resistance.

In the invention, it is optional that a hardener mixture is prepared by mixing the hardner, a part of the ketone resin, a part of the pigment blend and a solvent, and that a main mixture is prepared by mixing the epoxy resin, the rest of the ketone resin, the rest of the pigment blend, a solvent and an additive (see Example 4). Then, the hardener mixture and the main mixture are mixed immediately before the application of the coating composition.

The coating composition of the present invention is applied to the metallic protective film of the mirror by flow coating, spraying, brushing or the like so as to obtain a thickness of the back coating film in the range from about 30 to about 80 μm when dried. Then, the back coating film is acceleratingly dried at room temperature or a temperature not higher than 200° C. With this, the back coating film which is superior in, for example, corrosion resistance and chemical resistance is formed.

The present invention will be illustrated with the following nonlimitative examples.

EXAMPLE 1

At first, a silver mirror film was formed on a back surface of a glass substrate by a conventional method. Then, a metallic protective-film made of copper was formed on the surface of the silver mirror film by a conventional method. Then, a main mixture and a hardener mixture which have components shown in Table 1 were mixed so as to prepare a coating composition for preparing a back coating film. Polyamide resin was used as a hardener of the epoxy resin. Immediately after the mixing, the coating composition was applied to the surface of the metallic protective film by flow coating so as to obtain the back coating film having a thickness of 50 μm when dried. Then, the thus coated mirror was baked in a hot air circulation type electric drying furnace for 8 min at a temperature of 150° C. Then, the mirror was allowed to stand for three days at a temperature of 20° C. Then, specimens each having a width of 10 cm and a length of 20 cm were prepared by cutting the mirror. These specimens were subjected to the after-mentioned evaluation tests.

EXAMPLES 2–5

In Examples 2–5, a process of preparing a mirror according to Example 1 was repeated except in that the coating composition of Example 1 was modified as shown in Table 1.

COMPARATIVE EXAMPLES 1–5

In Comparative Examples 1–5, a process of preparing a mirror according to Example 1 was repeated except in that the coating composition of Example 1 was modified as shown in Table 2. In Comparative Examples 4 and 5, a petroleum resin and a coumarone indene resin were respectively used in place of the ketone resin.

With respect to the coating compositions of Examples 1–5 and Comparative Examples 1–5 shown in Tables 1 and 2, the equivalent ratio of the epoxy resin to the hardener (polyamide resin) was 1:1; the ketone resin contained in the main mixture and the hardener mixture was made of ARAKAWA CHEMICAL CO., LTD. and had a softening point of 95° C. and a molecular weight of 700; the petroleum resin was made of NIPPON ZEON CO., LTD. and had a softening point of 95° C.; the coumarone indene-resin was made of NIPPON STEEL CHEMICAL CO., LTD. and had a softening point of 110° C.; the basic lead carbonate and the zinc oxide were made of MITSUI MINING AND SMELTING CO., LTD.; the basic lead sulfate, aluminum phosphate and calcium molybdate were made of KIKUCHI COLOR AND CHEMICALS CORPORATION; the pigment dispersing additive was BYK-104 which is a trade name of BYK-CHEMIE JAPAN KK., and the polyamide resin was made of WITCO GMBH and had an amine value of 155.

The above-mentioned specimens of Examples 1–5 and Comparative Examples 1–5 were subjected to the following evaluation tests.

EVALUATION TESTS

1. Pencil Scratch Test

This test was made in accordance with JIS-K 5400 8.4. In Table 3, "A" means that a pencil having a hardness of H failed to give scratches on the back coating film of the specimen.

2. Cross-cut Adhesion Test

In this test, a portion of the back coating film of the specimen was cut with a knife so as to form 100 squares thereon each having widths of 1 mm. Then, a cellophane tape was attached to the portion having the 100 squares, and then the cellophane tape was removed to see if some squares are removed or not. In Table 3, "A" means that no squares peeled off after the test using ten specimens, and "B" means that some squares peeled off after the test using ten specimens.

3. Water Resistance Test

In this test, the specimen was immersed in pure water of 60° C. for 240 hr. Then, the specimen was withdrawn to see if the specimen has abnormality or not. In Table 3, "A" means that any abnormality was not found, and "B" means that abnormality was found.

4. 1 wt % HCl Immersion Test

In this test, four edge surfaces of the specimen were masked. Then, the specimen-was immersed in 1 wt % HCl solution of 20° C. for 240 hr. Then, the specimen was withdrawn to see if the silver mirror film has abnormality or not. In Table 3, "A" means that abnormality was not found on the silver mirror film, and "B" means that abnormality was found thereon.

5. 10 wt % HCl Immersion Test

In this test, four edge surfaces of the specimen were masked. Then, the specimen was immersed in 10 wt % HCl solution of 20° C. for 48 hr. Then, the specimen was withdrawn to see if the silver mirror film has abnormality or not. In Table 3, "A" means that abnormality was not found on the silver mirror film, and "B" means that abnormality was found thereon.

6. Alkali Immersion Test

In this test, the specimen was immersed in 5 wt % NaOH solution of 20° C. for 48 hr. Then, the specimen was withdrawn to see if the silver mirror film has abnormality or not. In Table 3, "A" means that abnormality was not found on the silver mirror film.

7. $H_2S$ Gas Exposure Test

In this test, the specimen was put in a desiccator charged with $H_2S$ gas at a temperature of 20° C. for 48 hr. In Table 3, "A" means that abnormality was not found on the silver mirror film after the test.

8. Bleaching Agent Immersion Test

In this test, four edge surfaces of the specimen were masked. Then, the specimen was immersed in a bleaching agent of 20° C. called HIGHTER which is a trade name of KAO Co. for 48 hr. Then, the specimen was withdrawn to see if the silver mirror film has abnormality or not. In Table 3, "A" means that abnormality was not found on the silver mirror film, and "B" means that abnormality was found thereon.

9. Detergent Immersion Test

In this test, four edge surfaces of the specimen were masked. Then, the specimen-was immersed in a detergent of 20° C. called SUN POHL which is a trade name of SUN POHL CO. Then, the specimen was withdrawn to see if the silver mirror film has abnormality or not. In Table 3, "A" means that abnormality was not found on the silver mirror film, and "B" means that abnormality was found thereon.

10. Salt Spray Test

The specimen was subject to a salt spray test according to JIS-Z 2371 for 240 hr. In Table 3, "A" means that abnormality was not found on the silver mirror film after the test, and "B" means that abnormality was found thereon after the test.

11. Humidity Resistance Test

The specimen was subject to a humidity resistance test according to JIS-K 5400 9.2 for 240 hr. In Table 3, "A" means that abnormality was not found on the silver mirror film after the test, and "B" means that abnormality was found thereon after the test.

12. Water and HCl Immersion Test

In this test, four edge surfaces of the specimen were masked. Then, the specimen was immersed in pure water of 60° C. for 240 hr and then in 1 wt % HCl of 20° C. for 48 hr. In Table 3, "A" means that abnormality was not found on the silver mirror film after the test, and "B" means that abnormality was not found thereon after the test.

13. Accelerated Weathering Test

The specimen was subjected to an accelerated weathering test according to JIS-K 5400 9.8 for 240 hr. In Table 3, "A" means that abnormality was not found on the silver mirror film and the back coating film did not have wrinkling, blistering nor cracking after the test.

14. Cutting Test

In this test, a glass substrate of the specimen was manually cut with a wheel cutter, and then the specimen was broken into two pieces. In Table 3, "A" means that the back coating film did not peel off and the specimen was sharply cut, and "B" means that the back coating film peeled off and the specimen was not sharply cut.

15. Cutting Test After Humidity Test

In the humidity test.;-the specimen was subjected to a condition of 40° C. and a relative humidity of from 80 to 85% for two years. Then, a glass substrate of the specimen was manually cut with a wheel cutter, and then the specimen was broken into two pieces. In Table 3, "A" means that back coating film did not peel off and the specimen was sharply cut, and "B" means that the back coating film peeled off and the specimen was not sharply cut.

TABLE 1

| Composition | COATING COMPOSITION | | | | |
|---|---|---|---|---|---|
| (parts by weight) | Ex. 1 | Ex. 2 | Ex. 3 | Ex. 4 | Ex. 5 |
| Main Mixture | | | | | |
| Epoxy Resin | 8 | 7.4 | 7.6 | 7.6 | 4.9 |
| Ketone Resin | 13.2 | 3.3 | 6.8 | 4.8 | 6.7 |
| Pigment Blend | | | | | |
| Basic Lead Carbonate | 7.2 | — | — | — | — |
| Basic Lead Sulfate | — | 4.7 | — | — | — |
| Aluminum Phosphate | — | — | 17.2 | — | — |
| Zinc Oxide | — | — | — | 19.3 | — |
| Calcium Molybdate | — | — | — | — | 14 |
| Red Iron Oxide | 12 | 15 | 14 | 12 | 17 |
| Talc | 12 | 19 | 8 | 6 | 10 |
| Precipitated Barium Sulfate | 4.8 | 8 | 3.7 | 3.6 | 5.7 |
| Solvents | | | | | |
| Cyclohexanone | 16 | 17 | 15 | 15 | 15 |
| Xylene | 15 | 17 | 15 | 13 | 15 |
| Pigment Dispersing Additive | 1 | 1 | 1 | 1 | 1 |
| Hardener Mixture | | | | | |
| Polyamide Resin (Hardener) | 2.8 | 2.6 | 2.6 | 2.6 | 1.7 |
| Solvents | | | | | |
| Xylene | 3 | 3 | 3 | 4 | 3 |
| n-Buthanol | 2 | 2 | 2 | 3 | 2 |
| Ketone Resin | — | — | — | 2 | — |
| Talc | — | — | — | 2 | — |
| Wt. Ratio of (Epoxy Resin + Polyamide Resin) to Ketone Resin | 45:55 | 75:25 | 60:40 | 60:40 | 50:50 |
| Wt. Ratio of Pigment Blend to Binder | 1.5:1 | 3.5:1 | 2.5:1 | 2.5:1 | 3.5:1 |

TABLE 1-continued

| Composition (parts by weight) | COATING COMPOSITION | | | | |
|---|---|---|---|---|---|
| | Ex. 1 | Ex. 2 | Ex. 3 | Ex. 4 | Ex. 5 |
| Corrosion-inhibitive Pigment Content of Pigment Blend (wt %) | 20 | 10 | 40 | 45 | 30 |

TABLE 2

| Composition (parts by weight) | COATING COMPOSITION | | | | |
|---|---|---|---|---|---|
| | Comp. Ex. 1 | Comp. Ex. 2 | Comp. Ex. 3 | Comp. Ex. 4 | Comp. Ex. 5 |
| Main Mixture | | | | | |
| Epoxy Resin | 4.5 | 21.2 | 4.9 | 7.6 | 7.6 |
| Ketone Resin | 11.1 | 1.5 | 4.4 | — | — |
| Petroleum Resin | — | — | — | 6.8 | — |
| Coumarone Indene Resin | — | — | — | — | 6.8 |
| Pigment Blend | | | | | |
| Basic Lead Carbonate | — | 1.5 | — | — | — |
| Basic Lead Sulfate | — | — | 14.7 | — | — |
| Aluminum Phosphate | — | — | — | 17.2 | — |
| Zinc Oxide | 25.7 | — | — | — | — |
| Calcium Molybdate | — | — | — | — | 17.2 |
| Red Iron Oxide | 12 | 12 | 17 | 14 | 14 |
| Talc | 4 | 12.5 | 12 | 8 | 8 |
| Precipitated Barium Sulfate | 1.2 | 4 | 5.4 | 3.7 | 3.7 |
| Solvents | | | | | |
| Cyclohexanone | 15 | 15 | 15 | 15 | 15 |
| Xylene | 15 | 15 | 15 | 15 | 15 |
| Pigment Dispersing Additive | 1 | 1 | 1 | 1 | 1 |
| Hardener Mixture | | | | | |
| Polyamide Resin | 1.5 | 7.3 | 1.7 | 2.6 | 2.6 |
| Solvents | | | | | |
| Xylene | 3 | 3 | 3 | 3 | 3 |
| n-Buthanol | 2 | 2 | 2 | 2 | 2 |
| Wt. Ratio of (Epoxy Resin + Polyamide Resin) to Ketone Resin | 35:65 | 95:5 | 60:40 | — | — |
| Wt. Ratio of Pigment Blend to Binder | 2.5:1 | 1.0:1 | 4.5:1 | 2.5:1 | 2.5:1 |
| Corrosion-inhibitive Pigment Content of Pigment Blend (wt %) | 60 | 5 | 30 | 40 | 40 |

TABLE 3

| | Examples | | | | | Comp. Exs. | | | | |
|---|---|---|---|---|---|---|---|---|---|---|
| | 1 | 2 | 3 | 4 | 5 | 1 | 2 | 3 | 4 | 5 |
| Pencil Scratch Test | A | A | A | A | A | A | A | A | A | A |
| Cross-cut Adhesion Test | A | A | A | A | A | B | A | B | A | B |
| Water Resistance Test | A | A | A | A | A | A | B | A | A | A |
| 1 wt % HCl Immersion Test | A | A | A | A | A | A | B | B | A | A |
| 10 wt % HCl Immersion Test | A | A | A | A | B | B | B | B | B | B |
| Alkali Immersion Test | A | A | A | A | A | A | A | A | A | A |
| H₂S Gas Exposure Test | A | A | A | A | A | A | A | A | A | A |
| Bleaching Agent Immersion Test | A | A | A | A | A | A | A | B | A | A |
| Detergent Immersion Test | A | A | A | A | A | A | A | B | A | A |
| Salt Spray Test | A | A | A | A | A | A | B | A | A | A |
| Humidity Resistance Test | A | A | A | A | A | A | B | A | A | A |
| Water and HCl Immersion Test | A | A | A | A | A | B | B | B | A | A |
| Accelerated Weathering Test | A | A | A | A | A | A | A | A | A | A |
| Cutting Test | A | A | A | A | A | B | B | A | A | A |
| Cutting Test After Humidity Test | A | A | A | A | A | B | B | B | B | B |

What is claimed is:

1. A coating composition for preparing a back coating film of a mirror, the mirror having a glass substrate, a silver mirror film formed on a back surface of the glass substrate, a metallic protective film formed on the silver mirror film, and the back coating film formed on the metallic protective film, the coating composition comprising:

a binder consisting of 40 to 85 parts by weight of the total of an epoxy resin and a hardener of the epoxy resin, and 15 to 60 parts by weight of at least one member selected from the group consisting of a ketone formaldehyde resin and its derivatives; and a pigment blend containing 7–55 wt % of a corrosion-inhibitive pigment based on weight of said pigment blend, wherein weight ratio of said pigment blend to said binder is in range from 1.2 to 4.0.

2. A coating composition according to claim 1, wherein the ketone formaldehyde resin is a cyclohexanoneformaldehyde resin.

3. A coating composition according to claim 1, wherein the corrosion-inhibitive pigment is a lead-free pigment.

4. A coating composition according to claim 3, wherein the lead-free pigment is a member selected from the group consisting of zinc oxide, aluminum phosphate, zinc phosphate, calcium zinc phosphate, aluminum tripolyphosphate, zinc molybdate, calcium molybdate, barium metaborate, calcium zinc molybdate, calcium cyanamide, aluminum phosphomolybdate and a mixture of calcium oxide and iron oxide.

5. A coating composition according to claim 1, wherein the ketone formaldehyde resin has a softening point ranging from 75° to 130° C.

6. A coating composition according to claim 1, wherein the epoxy resin is a bisphenol A epichlorohydrine type epoxy resin.

7. A coating composition according to claim 1, wherein the hardener is a member selected from the group consisting of an amine adduct, a polyamide resin and polyamine.

8. A coating composition according to claim 1, wherein the pigment blend further contains a body pigment and a coloring pigment.

9. A coating composition according to claim 1, wherein equivalent ratio of the epoxy resin to the hardener is from 1:2 to 2:1.

10. A coating composition comprising:

a binder consisting of 40 to 85 parts by weight of a total of an epoxy resin and a hardener of the epoxy resin, and 15 to 60 parts by weight of at least one member selected from the group consisting of a ketone formaldehyde resin and its derivatives; and a pigment blend containing 7–55 wt % of a corrosion-inhibitive pigment based on the the weight of the pigment blend, wherein weight ratio of said pigment blend to said binder is in range from 1.2 to 4.0.

11. A mirror comprising:

a glass substrate;

a silver mirror film formed on a back surface of said glass substrate;

a metallic protective film formed on said silver mirror film; and a back coating film formed on said metallic protective film, said back coating film comprising a cured coating composition wherein said coating composition, before curing, comprises:

a binder consisting of 40 to 85 parts by weight of the total of an epoxy resin and a hardener of the epoxy resin, and 15 to 60 parts by weight of at least one member selected from the group consisting of a ketone formaldehyde resin and its derivatives; and a pigment blend containing 7–55 wt. % of a corrosion-inhibitive pigment based on weight of said pigment blend, wherein a weight ratio of said pigment blend to said binder is in a range from 1.2 to 4.0.

* * * * *